United States Patent [19]

Hosoe et al.

[11] Patent Number: 4,541,382

[45] Date of Patent: Sep. 17, 1985

[54] METHOD AND APPARATUS FOR IGNITION TIMING CONTROL OF INTERNAL COMBUSTION ENGINE

[75] Inventors: Katsuharu Hosoe, Kariya; Yasuhito Takasu, Toyohashi; Toshiharu Iwata, Aichi, all of Japan

[73] Assignee: Nippondenso Co., Ltd., Kariya, Japan

[21] Appl. No.: 478,548

[22] Filed: Mar. 24, 1983

[30] Foreign Application Priority Data

Mar. 25, 1982 [JP] Japan ................................ 57-48411

[51] Int. Cl.$^4$ ............................................. F02P 5/14
[52] U.S. Cl. ................................................... 123/425
[58] Field of Search ................................. 123/425, 435

[56] References Cited

U.S. PATENT DOCUMENTS

| | | | |
|---|---|---|---|
| 4,233,944 | 11/1980 | Omori et al. | 123/425 |
| 4,268,910 | 5/1981 | Omori et al. | 123/425 |
| 4,376,429 | 3/1983 | Youngblood | 123/425 |
| 4,401,079 | 8/1983 | Aoki et al. | 123/425 |
| 4,413,599 | 11/1983 | Shigematsu et al. | 123/425 |

Primary Examiner—Parshotam S. Lall
Assistant Examiner—W. R. Wolfe
Attorney, Agent, or Firm—Cushman, Darby & Cushman

[57] ABSTRACT

Ignition timing for an internal combustion engine is controlled by subtracting a retard correction amount from a basic ignition timing. When engine knocking is detected, the retard correction amount is retarded from the basic ignition timing, but not so that the controlled timing drops below a predetermined limit. If knocking is not detected, the retard correction amount is advanced to thereby control the ignition timing towards, but not exceeding, a knocking limit.

8 Claims, 8 Drawing Figures

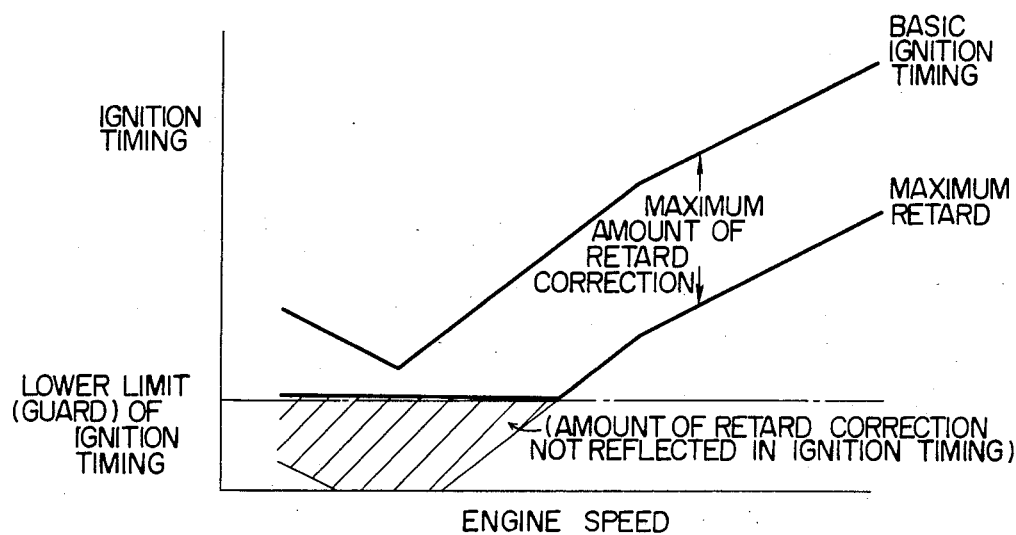

METHOD AND APPARATUS FOR IGNITION TIMING CONTROL OF INTERNAL COMBUSTION ENGINE

FIELD OF THE INVENTION

The present invention relates to a method and an apparatus for controlling the ignition timing of the internal combustion engine, which has the function to detect a knocking from the vibration or sound caused in or outside of a cylinder by the pressure in the cylinder of the internal combustion engine, and when a knocking is detected, to retard the ignition timing.

BACKGROUND OF THE INVENTION

In recent years, what is called the knocking feedback system for detecting a knocking which occurs in an internal combustion engine and for retarding the ignition timing in response to the detection has been studied from various angles. The knocking feedback system will be described briefly below.

The variations of noises caused in or outside of a cylinder due to the pressure in the cylinder of the internal combustion engine are detected, and when these vibrations or noises, as the case may be, exceed a set level (a knocking decision level), it is decided that a knocking has occurred so that a knocking signal is generated. Upon generation of the knocking signal, the ignition timing is retarded, while in the absence of the knocking signal, the ignition timing is advanced. In this way, the ignition timing is always controlled at a value near the knocking limit, thus improving the fuel economy and the output performance of the engine.

In this knocking feedback system, the knocking limit to which the ignition timing is controlled is subject to a change considerably toward the retard side according to the environmental conditions. As a result, the ignition timing is also controlled on the retard side. If the ignition timing is controlled to the retard side excessively, however, the temperature rise of the exhaust gas of the engine may damage the engine. Therefore, the lower limit of the ignition timing is required to be restricted. The conventional knock feedback systems are such that in the case where the knocking limit is moved to the retard side and the ignition timing is controlled to the retard side, the ignition timing is fixed to the lower limit. Nevertheless, the retard compensation representing the retard from the basic ignition timing determined in accordance with the engine speed and load is added by a predetermined retard amount up to a set maximum retard amount. This is because of the fact that even when the ignition timing has reached a lower limit, the retard compensation amount has not always reached the maximum retard amount. In the event that the knocking limit changes from this state toward the advance side with the change of the engine conditions or the like, the ignition timing fails to follow the change immediately and lags behind the change by the excessive retard compensation amount. On account of this time lag, the fuel efficiency and the output performance of the engine are adversely affected.

An object of the present invention is to provide a method and an apparatus for ignition timing control of the internal combustion engine, wherein in view of the above-described problem points, the retard compensation amount is not added upon detection of a knocking but the ignition timing is caused to follow the change of the knocking limit in the case where the knocking limit is located to a considerably retard side and the ignition timing has reached the lower limit for protection of the engine.

The present invention will be described with reference to FIG. 1. In FIG. 1(a), assume that the knocking limit A has changed to B on retarded side. The retard compensation amount increases as shown in FIG. 1 (c), and the ignition timing is retarded as shown in FIG. 1(b) (The dashed line indicates the case of the prior art system). When the ignition timing has reached the lower limit H, the ignition timing is fixed thereto. Under this condition, the retard compensation amount increases only up to J but not beyond. When the knocking limit changes from B to C toward the advance side, the ignition timing is rapidly advanced to follow the new knocking limit on account of the fact that the retard compensation is located at point J.

According to the present invention, the retard compensation amount representing the retard from the basic ignition timing is not added any more, in the case where the knocking limit is located considerably to retard side and the ignition timing is fixed at the lower limit. In other words, in the case where the ignition timing is fixed to the lower limit as mentioned above, the retard compensation amount is set to the difference between the basic ignition timing and the lower limit of the ignition timing (FIG. 2). Accordingly, the present invention prevents the failure of the ignition timing to follow the change of the knocking limit which otherwise might occur on account of an extraneous retard compensation amount, with the result that the ignition timing is caused all the time to follow the change of the knocking limit, thereby preventing the fuel efficiency and output performance from being deteriorated.

BRIEF DESCRIPTION OF THE DRAWINGS

FIG. 2 is a characteristic diagram showing the relation between the engine speed and maximum retard compensation amount in the present invention.

DESCRIPTION OF PREFERRED EMBODIMENT

Figure 1A:
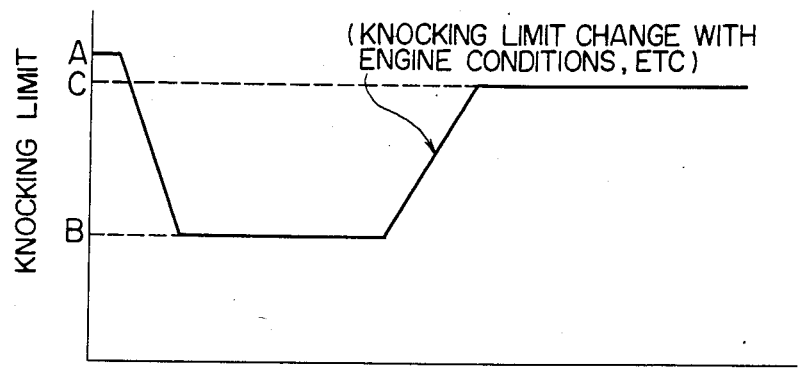
FIGS. 1a-c are diagram comparing the ability of the apparatus of the present invention to follow the change of the knocking limit with that of the conventional systems.
Figure 1B:
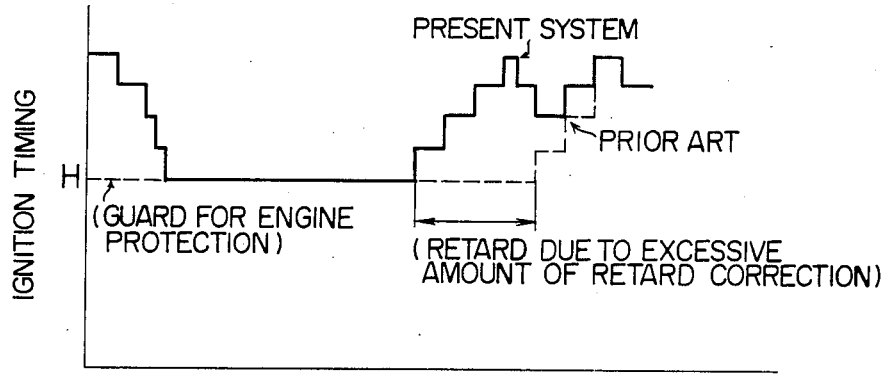
Figure 1C:
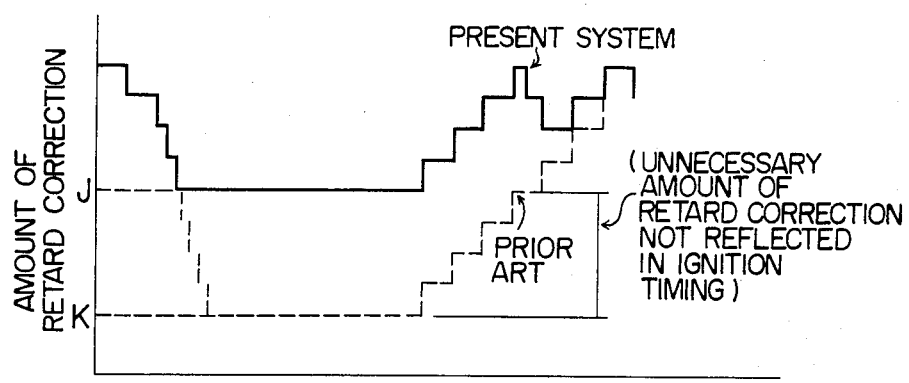
Figure 3:
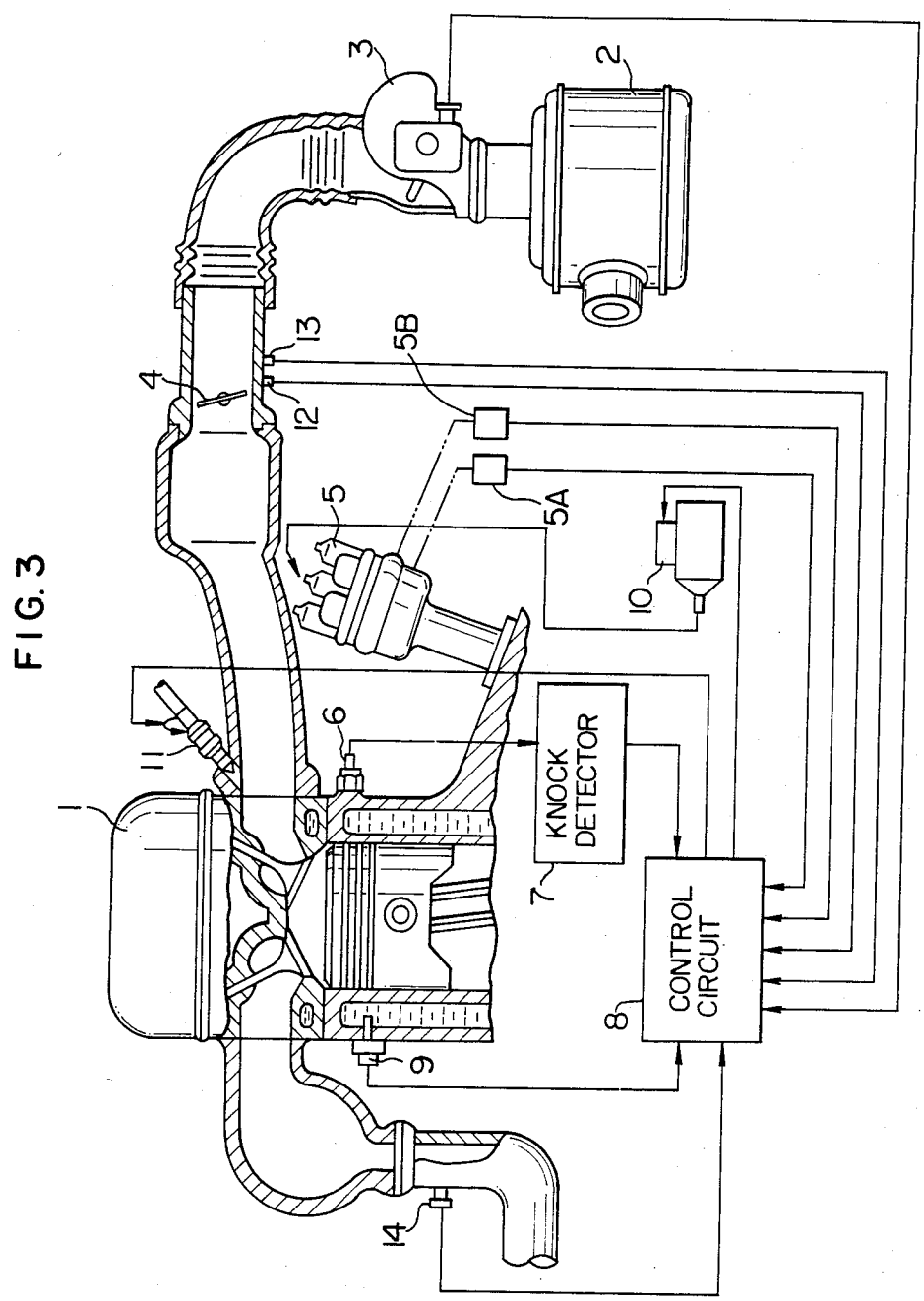
FIG. 3 shows a general configuration of an apparatus for implementing the method of ignition timing control of the internal combustion engine according to an embodiment thereof.

Reference is made to the drawings. FIG. 3 is a diagram showing a configuration according to an embodiment of the present invention. In FIG. 3, reference numeral 1 designates a four-cylinder four-cycle engine, numeral 2 an air cleaner, numeral 3 air flowmeter for detecting the intake air amount of the engine and producing a signal corresponding thereto, numeral 4 a throttle valve, and numeral 5 a distributor containing a reference angle sensor 5A for detecting the reference crank angle (such as the top dead center) of the engine and a crank angle sensor 5B for generating an output signal for each predetermined crank angle of the engine. Numeral 6 designates a knock sensor for detecting the engine block vibration corresponding to the knocking of the engine with a piezoelectric system (piezoelectric element) or an electromagnetic system (magnet or coil). Numeral 7 designates a knock detector circuit for detecting a knock generation of the engine in response to an output of the knock sensor. Numeral 9 designates a water temperature sensor for generating a signal associated with the cooling water temperature of the engine, numeral 12 a full-closed switch (idle switch) for producing a signal when the throttle valve 4 is in fully closed state. Numeral 13 designates a full-open switch (power switch) for producing a signal when the throttle valve 4 is in substantially fully opened state. Numeral 14 designates an oxygen sensor for generating an output signal in accordance with whether the air-fuel ratio of the exhaust gas is lower (rich) or higher (lean) than the stoichiometric air-fuel ratio.

Numeral 8 designates a control circuit for controlling the air-fuel ratio and the ignition timing of the engine in accordance with the condition of the input signal from the sensors and the switches. Numeral 10 designates an ignition coil and an ignitor for cutting off power to the ignition coil in response to the ignition timing control signal produced from the control circuit 8. The high voltage produced at the ignition coil starts the ignition plug of a predetermined cylinder at appropriate timing through the distributing section of the distributor 5. Numeral 11 designates an injector for injecting the fuel into the intake manifold on the basis of the fuel injection timing and fuel injection time ($\tau$) determined by the control circuit 8.

Figure 4:
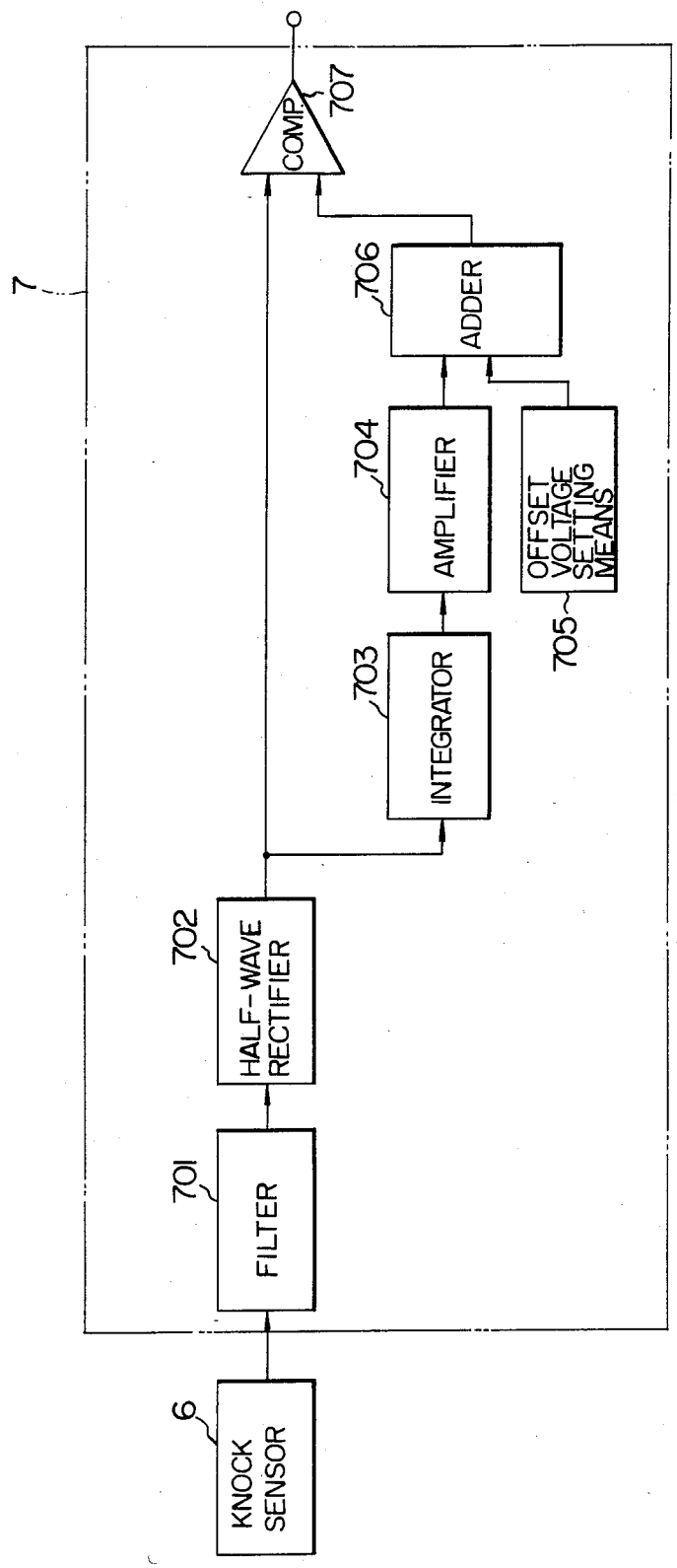
FIG. 4 is a diagram showing a configuration of a knocking detecter circuit in FIG. 3.

Now, the knock detector circuit 7 will be explained in detail with reference to FIG. 4. Numeral 701 designates a filter such as a bandpass or high-pass filter for selectively picking up the knock frequency component alone from the output of the knock sensor 6. Numeral 702 designates a half-wave rectifier for half-wave rectifying the output of the filter 701. Numeral 703 designates an integrator for picking up the average value of the vibration output of the knock sensor 6. Numeral 704 designates an amplifier for amplifying the output of the integrator 703 and producing a proper knock decision level. Numeral 705 designates an offset voltage setting means including resistors etc. for realizing shift of voltage in order to provide a noise margin to the output of the amplifier 704. Numeral 706 designates an adder for adding the outputs of the amplifier 704 to the output of the offset voltage setting means 705 and thus producing the final knock decision level. Numeral 707 designates a comparator for comparing the output of the half-wave rectifier 702 with the output of the adder 706, and when the output of the half-wave rectifier 702 is larger, deciding that a knocking has occurred, in which case the comparator 707 produces a pulse signal. The output of the comparator 707 is applied to the control circuit 8 for computing the ignition timing.

Figure 5:
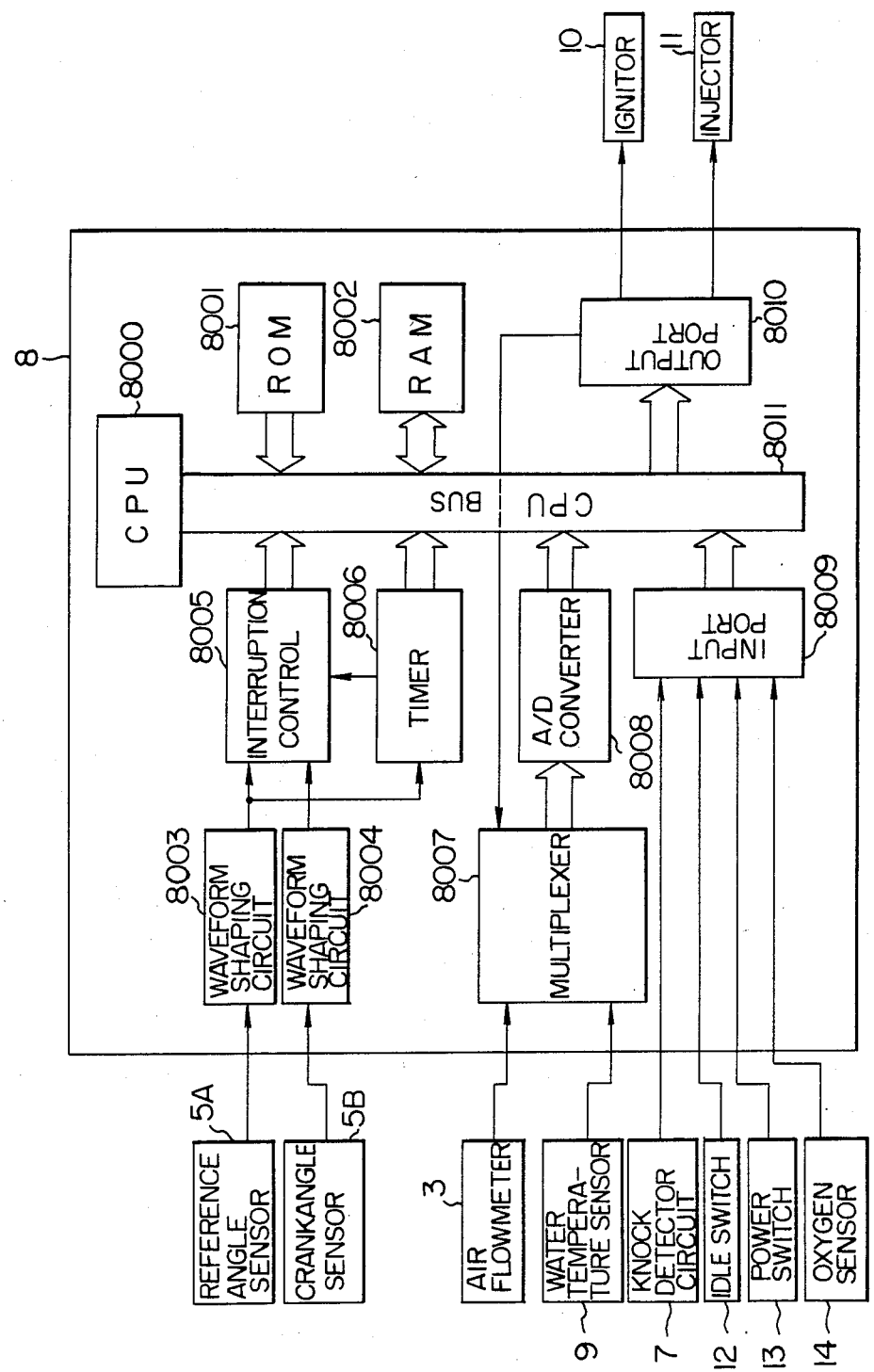
FIG. 5 is a diagram showing a configuration of a control circuit in FIG. 3.

Now, the construction and operation of the control circuit 8 will be described in detail with reference to FIG. 5. In FIG. 5, numeral 8000 designates a central processing unit (CPU) including a microprocessor of 8-bit system for computing the ignition timing and fuel injection amount. Numeral 8001 designates a readonly memory unit (ROM) for storing a control program and control constants which are necessary for computation. Numeral 8002 designates a random access memory (RAM) for temporarily storing the computation data in the course of operation of the CPU 8000 according to the program. Numeral 8003 designates a waveform-shaping circuit for the magnet pickup signal produced from the reference angle sensor 5A. Numeral 8004 designates a waveform-shaping circuit for shaping the waveform of the output signal of the crankangle sensor 5B in similar manner.

Numeral 8005 designates an interruption control section for causing the CPU to interrupt in response to an external or internal signal. Numeral 8006 designates a 16-bit timer constructed to increase the count thereof by one for each clock period providing the basic period of the CPU operation. Through the timer 8006 and the interruption control section 8005, the engine speed and crankangle are applied to the CPU as it will be described below.

Each time an interruption occurs by the output signal of the reference angle sensor 5A, the CPU reads out the count of the time. The timer count increases at every clock period (for example 1 $\mu$s), and therefore it is possible to measure the time interval of the reference angle sensor signals, namely, the time required for one revolution of the engine by computing the difference between the count at the time of present interruption and the count associated with the preceding interruption. In this way, the engine speed is obtained. In view of the fact that the signal of the crankangle sensor 5B is produced for each predetermined crankangle (for instance, 30° CA), the crank angle based on the top dead center signal of the reference angle sensor 5A may be determined in units of 30° CA. The crankangle signal in units of 30° CA is used at a reference point for generating the ignition timing control signal.

Numeral 8007 designates a multiplexer for appropriately switching a plurality of analog signals and applying them to an analog-digital converter (A/D converter) 8008. The switching time of the multiplexer 8007 is controlled by the control signal produced from an output port 8010. In this embodiment, an intake air amount signal and a water temperature signal are supplied as analog signals from the air flowmeter 3 and the water temperature sensor 9 respectively. Numeral 8008 designates an A/D converter for converting the analog signals into digital signals. Numeral 8009 designates an input port for the digital signals, which port is supplied with a knock signal from the knock detector circuit 7, an idle signal from the idle switch 12, a power signal from the power switch 13, and a rich or lean signal from the oxygen sensor 14.

Numeral 8010 designates an output port for producing a digital signal. The ignition timing control signal for the ignitor 10, the fuel injection timing control signal for the injector 11 and the control signal for the multiplexer 8007 are produced from this output port. Numeral 8011 designates a CPU bus which carries the control signals and data signals for controlling the peripheral circuits and data exchange.

Figure 6:
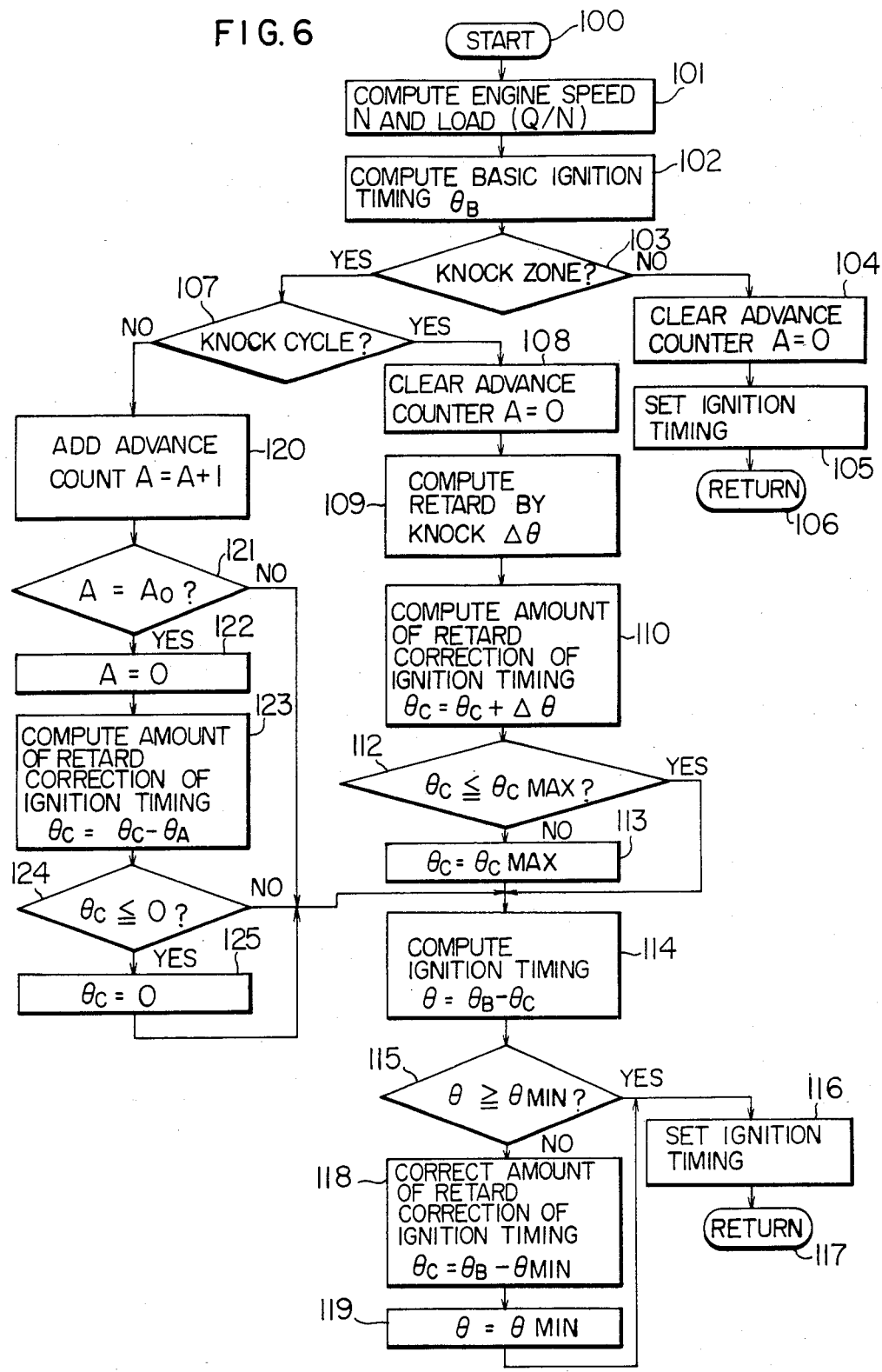
FIG. 6 is a flowchart showing the operating processes of the ignition timing and retard compensation amount according to the present invention.

A construction of the apparatus embodying the present invention has been described as above, and now explanation will be made about the computing operation of the ignition timing and retard compensation amount performed at the control circuit 8 with reference to the flowchart of FIG. 6. When the internal combustion engine is started, the interruption routine for the ignition timing computation is begun at step 100. At step 101 the engine speed N and the load (Q/N) are computed. Q designates the intake air amount of the engine. At step 102, on the basis of the engine speed N and the load (Q/N) computed at step 101, the basic ignition timing $\theta_B$ is computed from a map of basic ignition timing. At step 103 it is decided whether or not the knock feedback zone is involved, and if the knock feedback zone is involved, the process branches out to "Yes" to the step 107. If the knock feedback zone is not involved such as under a light load, on the other hand, the process proceeds to "No", and at step 104, the advance counter A is cleared to zero. At step 105 an ignition timing is set, and through step 106 the process returns to the main routine.

If it is determined at step 103 that the knock feedback zone is involved and the process proceeds to "Yes", the presence or absence of a knocking is decided at step 107. In the absence of a knocking, the process branches to "No" to step 120. If a knocking is present, on the other hand, the process proceeds to "Yes" to step 108, where the advance counter A is cleared to zero. At step 109, the retard amount $\Delta\theta$ is computed according to the strength and frequency of the knocking, followed by step 110 where the retard amount $\Delta\theta$ computed at step 109 is added to the amount of retard correction $\theta_c$ of the ignition timing thereby to set a new amount of retard correction $\theta_c$. At step 112 it is decided whether or not the amount of retard correction $\theta_c$ is less than the maximum retard compensation amount $\theta_{cmax}$ and if $\theta_c$ is less than $\theta_{cmax}$, the process branches to "Yes" to step 114. If the amount of retard correction $\theta_c$ is larger than the maximum retard compensation $\theta_{cmax}$, by contrast, the process proceeds to "No" so that the amount of retard correction $\theta_c$ is set to $\theta_c = \theta_{cmax}$ at step 113. At step 114 the ignition timing $\theta$ is computed by the formula $\theta = \theta_B - \theta_c$ on the basis of the basic ignition timing $\theta_B$ and the amount of retard correction $\theta_c$.

At step 115 it is decided whether or not the ignition timing $\theta$ calculated at step 114 is larger than the ignition timing guard $\theta_{min}$ for preventing the increase of the exhaust gas temperature, and if the ignition timing $\theta$ is larger than the ignition timing guard $\theta_{min}$, the process branches to "Yes" to step 116. In the case where the ignition timing $\theta$ is smaller than the ignition timing guard $\theta_{min}$, on the other hand, the process branches to "No", so that the amount of retard correction $\theta_c$ is corrected by the formula $\theta_c = \theta_B - \theta_{min}$ at step 118. The process at step 118 prevents the extraneous retard compensation amount not reflected in the ignition timing from being increased. At step 119 the ignition timing $\theta$ is corrected to the ignition timing guard $\theta_{min}$. At step 116 the ignition timing is set, and at step 117 the process returns to the main routine.

In the case where it is decided at step 107 that any knocking has not occurred and the process is passed to step 120, 1 is added in the advance counter A at step 120. At step 121 it is decided whether or not a knocking has occurred during a predetermined period Ao (cycle), and if the predetermined period Ao has not yet passed after the previous knocking, the process proceeds to "No" to step 114. The processes similar to those mentioned above are executed at and subsequent to step 114. If it is decided at step 121 that the predetermined period Ac has passed after occurence of the previous knocking, on the other hand, the process branches to "Yes", so that the advance counter A is cleared to zero at step 122. At step 123 a computation $\theta_c = \theta_c - \theta_A$ is carried out, and the amount of retard correction $\theta_c$ is reduced by the advance $\theta_A$ thereby to set a new amount of retard correction $\theta_c$. At step 124 it is decided whether or not the amount of retard correction $\theta_c$ is less than zero, and if the answer is "No", the process is passed to step 114. If the answer is "Yes", by contrast, the amount of retard correction $\theta_c$ is set to zero at step 125, followed by step 114 for effecting the processes similar to those mentioned above. The ignition timing is thus computed and the engine is fired through the ignitor and the coil.

We claim:

1. A method of controlling ignition timing for an internal combustion engine, comprising the steps of:
   detecting revolution speed of said engine;
   detecting load exerted on said engine;
   determining a basic ignition timing $\theta_B$ based on said detected speed and load, said $\theta_B$ representing an upper knocking limit of said engine;
   sensing the occurrence of knocking in said engine; and
   computing an engine timing $\theta$, based on said basic timing $\theta_B$ and an amount of retard correction $\theta_c$, to be appiled to said engine, wherein $\theta_c$ is advanced if no knocking is sensed and retarded if knocking is sensed, and wherein said computing step further includes the steps of:
   determining a retard amount $\Delta\theta$ based on said sensed knocking,
   computing said amount of retard correction $\theta_c$ based on said determined retard amount $\Delta\theta$ and the most recent previous value of $\theta_c$,
   limiting said amount of retard correction $\theta_c$ to a value no more than a maximum value $\theta_{c\ max}$,
   calculating the ignition timing $\theta$ to be applied to said engine by subtracting $\theta_c$ from $\theta_B$, and
   setting $\theta$ equal to a defined minimum value $\theta_{min}$ whenever said calculation of $\theta$ yields a value less than $\theta_{min}$.

2. A method as in claim 1 wherein said computing step further includes the step of setting $\theta_c$ equal to the present value of $\theta_B$ minus the defined value of $\theta_{min}$ whenever $\theta$ is set equal to $\theta_{min}$.

3. A method as in claim 1 wherein said computing step further includes the step of reducing $\theta_c$ by a determined amount whenever no knocking is sensed for a predetermined period of time, wherein said reducing advances the ignition timing $\theta$ with respect to its previous setting.

4. An aparatus for controlling ignition timing of an internal combustion engine, comprising:
   detector means for detecting revolution speed of and load exerted on said engine;
   basic timing means for determinig a basic ignition timing $\theta_B$ based on the detections of said detector means, said $\theta_B$ representing an upper knocking limit of said engine;
   knock sensor means for sensing the occurrence of knocking in said engine; and
   engine ignition timing means for determining actual ignition timing $\theta$ for application to said engine based on said basic ignition timing and said sensed occurrence of knocking, said engine ignition timing means including
   means for determining an amount of retard $\Delta\theta$ based on said sensed knocking,
   means for calculating a retard correction amount $\theta_c$ based on $\Delta\theta$ and the most recent value of $\theta_c$,
   means for setting $\theta_c$ at a maximum value $\theta_{c\ max}$ if said calculated amount of retard correction exceeds $\theta_{c\ max}$, means for determining the actual ignition timing $\theta$ by substracting the retard correction amount $\theta_c$ from the basic ignition timing $\theta_B$, and means for setting $\theta$ at a minimum value $\theta_{min}$ if said determined actual ignition timing falls below $\theta_{min}$.

5. An apparatus according to claim 4, wherein said engine ignition timing means comprises a central processing unit for computing said actual ignition timing $\theta$, a read only memory for storing programs steps to be executed by said central processing unit, a random access memory for storing data representative of signals processed by said central processing unit, input means for inputting outputs of said knock sensor means and said detector means to said central processing unit, and output means for outputting said actual ignition timing to an engine ignitor of said engine.

6. An apparatus according to claim 4, wherein said engine ignition timing means includes a microcomputer operated so as to perform the recited functions of said engine ignition timing means.

7. An apparatus as in claim 4 wherein said engine ignition timing means further includes means for decreasing said amount of retard correction $\theta_c$ if no knocking is sensed within a predetermined time period.

8. An apparatus as in claim 4 wherein said engine ignition timing means further includes means for establishing the amount of retard correction $\theta_c$ to equal to the present value of $\theta_B$ minus $\theta_{min}$ when said means for setting $\theta$ at a minimum value $\theta_{min}$ carries out its function.

* * * * *